United States Patent
Son

(10) Patent No.: US 6,741,234 B2
(45) Date of Patent: May 25, 2004

(54) OPTICAL MOUSE USING A TOTAL REFLECTION PRISM

(75) Inventor: Sang Eun Son, Suwon-Shi (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 50 days.

(21) Appl. No.: 09/850,576

(22) Filed: May 7, 2001

(65) Prior Publication Data

US 2002/0080120 A1 Jun. 27, 2002

(30) Foreign Application Priority Data

Dec. 21, 2000 (KR) .................................... P2000-79902

(51) Int. Cl.$^7$ ................................................. G09G 5/08
(52) U.S. Cl. ....................................... 345/166; 345/163
(58) Field of Search .......................... 345/163, 165–166

(56) References Cited

U.S. PATENT DOCUMENTS

| | | | | |
|---|---|---|---|---|
| 4,647,771 A | | 3/1987 | Kato ...................... 250/237 R |
| 4,920,260 A | * | 4/1990 | Victor et al. ................ 250/221 |
| 5,086,197 A | * | 2/1992 | Liou ........................... 178/18 |
| 6,124,587 A | * | 9/2000 | Bidiville et al. ............ 250/221 |
| 6,256,016 B1 | * | 7/2001 | Piot et al. .................... 345/166 |
| 6,330,057 B1 | * | 12/2001 | Lederer et al. ................ 356/28 |
| 6,353,478 B1 | * | 3/2002 | Rudd et al. .................. 356/631 |
| 2002/0061739 A1 | * | 5/2002 | Nakamura et al. .......... 455/343 |

* cited by examiner

Primary Examiner—Kent Chang
Assistant Examiner—Tom Sheng
(74) Attorney, Agent, or Firm—Ladas & Parry

(57) ABSTRACT

Disclosed is an optical mouse which can move a cursor on a display screen of a computer system by totally reflecting light, which is emitted from a light source and is reflected upon a surface after transmitting a glass, using a prism and varying a light path to condense the light on a light-receiving lens so as to allow an optical sensor to sense an image. The optical mouse includes a light source for emitting light, an irradiating lens for irradiating the light emitted from the light source to a surface, a light-receiving lens for condensing light irregularly reflected upon the surface in the light emitted from the light source and irradiated through the irradiating lens, a total reflection prism for allowing the light emitted from the light source and irradiated through the irradiating lens to be located on a path where totally reflected light upon the surface advances, after transmitting a transparent material such as a glass, and reflecting incident light through a reflecting surface to be condensed on the light-receiving lens, and an optical sensor for sensing the light condensed through the light-receiving lens.

4 Claims, 5 Drawing Sheets

OPTICAL MOUSE USING A TOTAL REFLECTION PRISM

BACKGROUND OF THE INVENTION

1. Field of the Invention

The present invention relates to an optical mouse, and more particularly to, an optical mouse which can move a cursor on a display screen of a computer system by totally reflecting light, which is emitted from a light source and is reflected upon a surface after transmitting through a glass, using a prism and varying a light path to condense the light on a light-receiving lens so as to allow an optical sensor to sense an image.

2. Description of the Prior Art

Generally, in a mouse used as a main input means of a computer, a mechanically moving portion, for example, a ball mouse having a ball has problems in that sliding occurs due to dust and a user's movement may not be exactly transferred to a display screen of a computer system when the user moves the ball mouse. Also, a problem arises in that it is difficult to use the ball mouse for a long time due to abrasion of the ball and parts in contact with the ball.

To solve such problems, there has been suggested an optical mouse. The optical mouse includes a sensor array consisting of a plurality of optical sensors, optical parts for condensing light reflected upon the optical sensors, and mechanical structures.

FIG. 1 shows a relationship between a surface and a sensor array. Referring to FIG. 1, light emitted from a light source such as a light-emitting diode (LED) is reflected upon the surface, and cells of optical sensors of the sensor array sense the reflected light.

FIG. 2 shows tracking by comparison of bitmaps. Referring to FIG. 2, a sensor array consisting of a plurality of optical sensors compares bitmaps generated by sensing light, so that movement and direction of devices are provided by movement of a cursor of a computer system.

At this time, the generated bitmaps are constituted by a quadratic equation (1 or 0).

FIG. 3 shows a configuration of a related art optical mouse.

Referring to FIG. 3, a reference numeral 11 denotes a button pressed by a user, a reference numeral 12 denotes a switch turned on/off depending on the operation of the button 11, and a reference numeral 13 denotes a circuit board that supports the switch 12.

Also, a reference numeral 14 denotes a light source that emits light, a reference numeral 15 denotes a lens for condensing light, and a reference numeral 16 denotes a housing that supports the overall structure. A reference numeral 17 denotes a lens integrated circuit (IC) that includes a sensor array, a logic circuit, and an inverter. A reference numeral 18 denotes a surface and a reference numeral 19 denotes an optical guide that guides light from the surface 18 to the lens IC 17.

The operation of the aforementioned optical mouse will briefly be described with reference to FIGS. 3 and 4. Light emitted from the light source 14 and reflected upon the surface 18 is condensed by the lens 15 and transferred to cells of the optical sensor of the lens IC 17, so that the optical sensor array converts moving optical images sensed by light to circuit signals. Thus, the converted circuit signals are transferred to a computer system to be displayed on a display screen by moving a cursor.

That is, since most of the emitted light is reflected upon a general surface, sufficient light to be sensed by the sensor is obtained. Accordingly, no problem arises in that the optical mouse is operated.

However, the optical mouse, as shown in FIG. 5, has a surface far away from a glass by a thickness of the glass in transferring the light to the sensor. In this case, light of 90% or greater is transmitted on the glass to cause the amount of the reflected light to be inadequate, thereby resulting in that the sensor fails to sens the light. For this reason, a problem arises in that the sensor does not function as a control device.

In other words, the aforementioned optical mouse is based on light irregularly reflected upon the surface. As shown in FIG. 5, light which has not passed through a transparent medium such as a glass is absolutely lacking in the amount of irregularly reflected light. After all, the aforementioned related art optical mouse has several problems. The optical sensor fails to sense images on the glass so as not to move a cursor of a display screen of the computer system. This is because the light-receiving lens and the sensor are set at a particular point in an irregularly reflected light path on the surface under the circumstances that there is no transparent medium, at the time of design of the optical mouse, so as not to allow the reflected light which has transmitted through the transparent medium to advance the light-receiving lens and the sensor.

SUMMARY OF THE INVENTION

It is, therefore, an object of the present invention to provide an optical mouse which can move a cursor on a display screen of a computer system by totally reflecting light, which is emitted from a light source and is reflected upon a surface after transmitting a glass, using a prism and varying a light path to condense the light on a light-receiving lens so as to allow an optical sensor to sense an image.

To achieve the above object, there is provided an optical mouse which includes a light source for emitting light, an irradiating lens for irradiating the light emitted from the light source to a surface, a light-receiving lens for condensing light irregularly reflected upon the surface in the light emitted from the light source and irradiated through the irradiating lens, a total reflection prism for allowing the light emitted from the light source and irradiated through the irradiating lens to be located on a path where totally reflected light upon the surface advances, after transmitting through a transparent material such as glass, and reflected incident light by a reflecting surface to be condensed on the light-receiving lens, and an optical sensor for sensing the light condensed through the light-receiving lens.

The optical mouse according to the present invention is characterized in that the irradiating lens, the light-receiving lens, and the total reflection prism are formed in an integral form with one another.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

Figure 1:
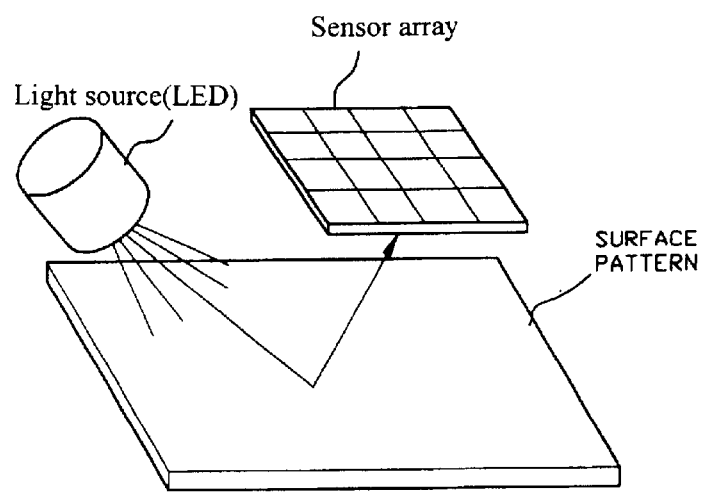
FIG. 1 shows a relationship between a surface and a sensor array.
Figure 2:
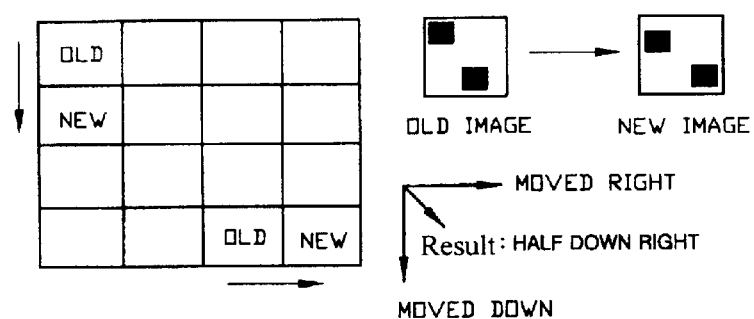
FIG. 2 shows tracking by comparison of bitmaps.
Figure 3:
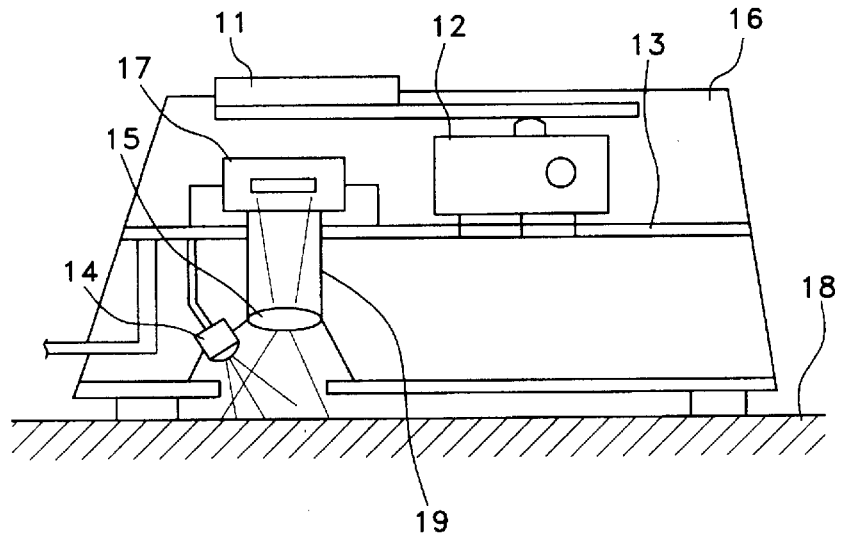
FIG. 3 shows a configuration of a related art optical mouse.
Figure 4:
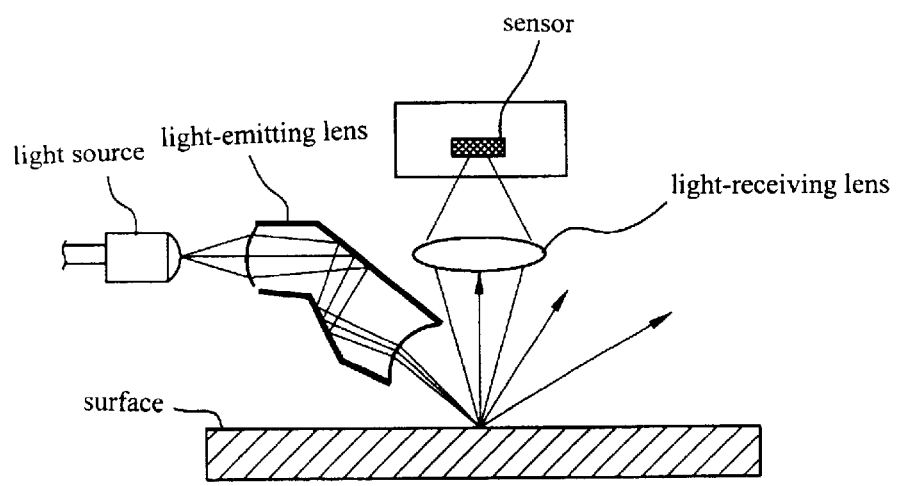
FIG. 4 shows the operation on a general surface of the related art optical mouse.
Figure 5:
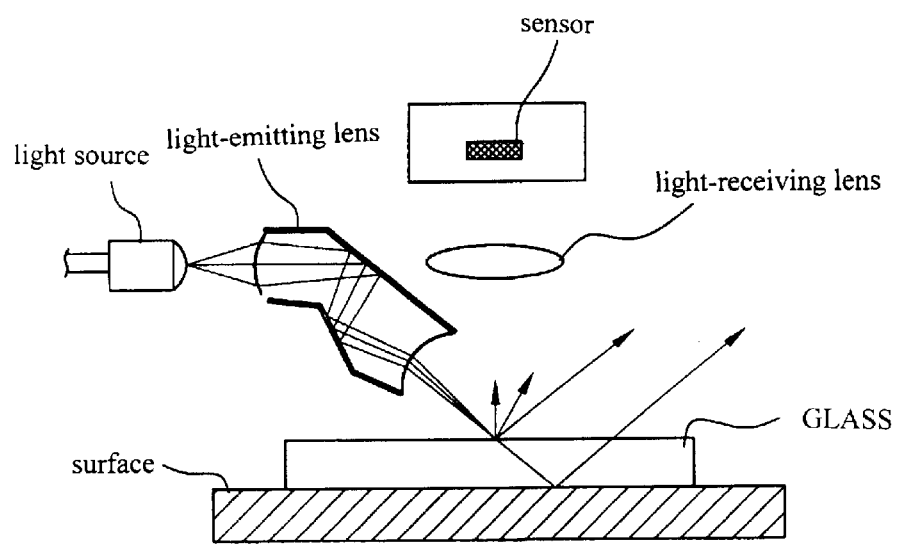
FIG. 5 shows the operation on a glass of the related art optical mouse.

A preferred embodiment of the present invention will now be described with reference to the accompanying drawings. In the following description, same drawing reference numerals are used for the same elements even in different drawings. The matters defined in the description such as a detailed construction and elements of a circuit are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

First, total reflection of the present invention will be described with reference to FIG. 6.

Figure 6:
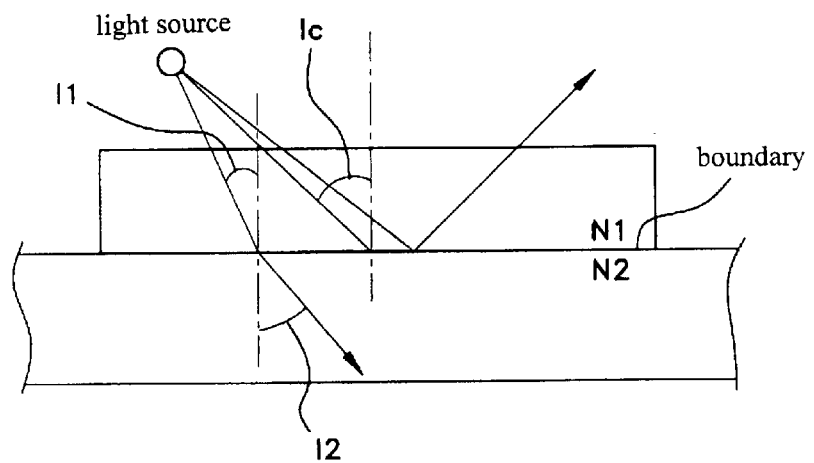
FIG. 6 is an exemplary view illustrating total reflection according to the present invention.

Referring to FIG. 6, N1 and N2 respectively denote refractive indexes of corresponding mediums, a reference numeral Ic denotes a threshold angle, and a reference numeral I1 denotes an incident angle of light irradiated from a light source. A reference numeral I2 denotes a refractive angle curved while incident light that passes through two mediums having different refractive indexes passes through a boundary.

As shown in FIG. 6, supposing that the refractive angle I2 is greater than the incident angle I1 and the incident angle I1 entered to allow the refractive angle I2 to obtain 90° is a threshold angle Ic when the refractive indexes N1 and N2 of the respective mediums are N1>N2, the light entered in the boundary is totally reflected as no refractive angle exists in case of I1>Ic. This is called total reflection.

Figure 7:
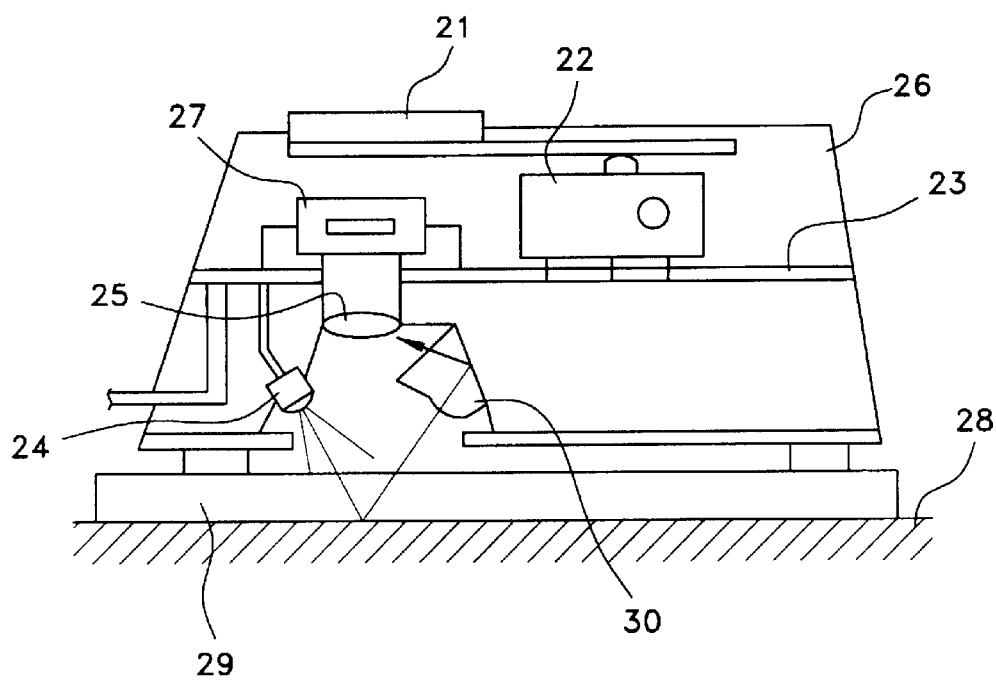
FIG. 7 shows a configuration of an optical mouse according to the present invention.

A configuration of an optical mouse according to the present invention is shown in FIG. 7.

Referring to FIG. 7, a reference numeral 21 denotes a button pressed by a user, a reference numeral 22 denotes a switch turned on/off depending on the operation of the button 21, and a reference numeral 23 denotes a circuit board that supports the switch 22.

Also, a reference numeral 24 denotes a light source that emits light, a reference numeral 25 denotes a light-receiving lens for condensing light, and a reference numeral 26 denotes a housing that supports the overall structure. A reference numeral 27 denotes a lens integrated circuit (IC) that includes a sensor array, a logic circuit, and an inverter. A reference numeral 28 denotes a surface and a reference numeral 29 denotes a glass. A reference numeral 30 denotes a total reflection prism for totally reflecting incident light.

The operation of the optical mouse on the general surface will now be described with reference to FIG. 8.

The light emitted from the light source and reflected upon the surface is condensed on an optical sensor by a light-receiving lens. Thus, the optical mouse can perform its function.

Meanwhile, the operation of the optical mouse on the glass will be described with reference to FIG. 9. When the optical mouse is on the glass, the light emitted from the light source transmits through the glass and is reflected upon the surface. The light reflected upon the surface is totally reflected so that a light path advances toward the total reflection prism. The light condensed on the total reflection prism is reflected in the boundary of the total reflecting prism and the light passed through the light-receiving lens is condensed on the optical sensor to allow the optical sensor to sense the light. Thus, the optical mouse can be operated on the glass as well as the non-transparent surface, so that the cursor can move on the display screen of the computer system.

At this time, a light-emitting lens, the light-receiving lens, and the total reflection prism may be formed in an integral form with one another.

Figure 8:
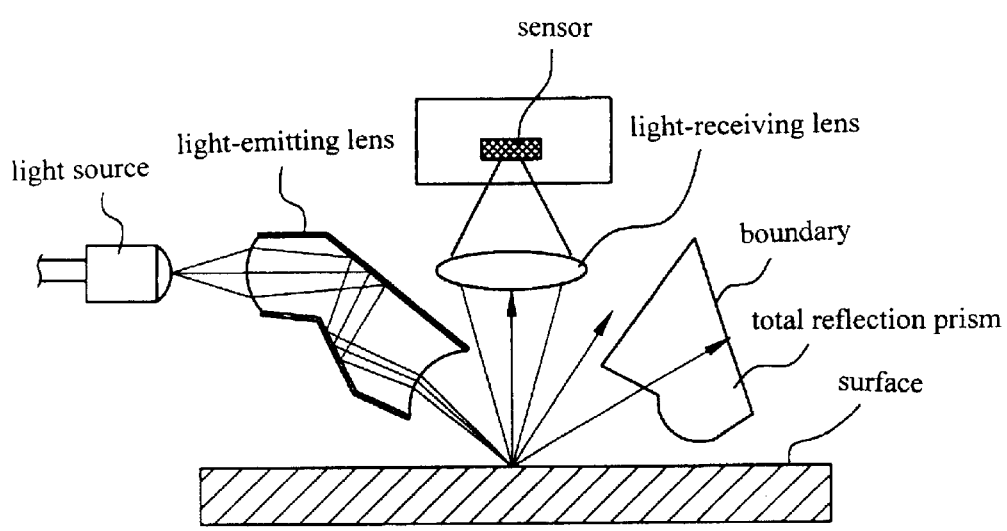
FIG. 8 shows the operation on a general surface of the optical mouse according to the present invention.
Figure 9:
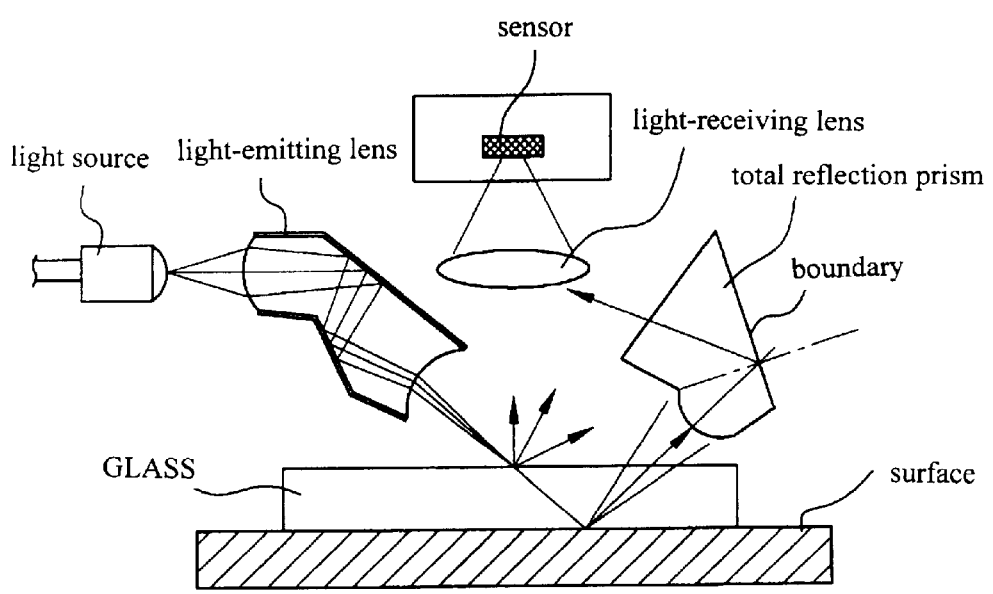
FIG. 9 shows the operation on a glass of the optical mouse according to the present invention.

Referring to FIG. 8 or 9, the light source and the light-emitting lens are denoted by one reference numeral 24 of FIG. 7.

As aforementioned, the optical mouse according to the present invention has the following advantage.

It is possible to move the cursor on the display screen of the computer system by allowing the optical sensor to sense light on the transparent material such as a glass using the total reflection prism that can sense the light emitted from the light source and reflected upon the surface after transmitting the transparent material.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An optical mouse adapted for use on transparent and non-transparent surfaces, said optical mouse comprising:

a light source for emitting light;

an irradiating lens for irradiating the light emitted from the light source to a surface;

a light-receiving lens positioned to condense light irregularly reflected from a non-transparent surface when the mouse travels on said non-transparent surface;

a total reflection prism for allowing the light emitted from the light source and irradiated through the irradiating lens to be located on a path where the light is totally reflected from the non-transparent surface after the light has been transmitted through a transparent material on which the mouse travels, the totally reflected light passing from the non-transparent surface through the transparent material to the total reflecting prism, said total reflecting prism having a light reflecting surface to reflect the light reflected by the non-transparent surface to the light receiving lens, and an optical sensor for sensing the light condensed through the light-receiving lens whether reflected directly from the non-transparent surface or reflected by the total reflection prism, whereby the optical sensor can determine position of the optical mouse when the mouse travels on either said transparent or non-transparent surface.

2. The optical mouse of claim 1, wherein the irradiating lens, the light-receiving lens, and the total reflection prism are formed in an integral form with one another.

3. The optical mouse of claim 1, wherein the light from the irradiating lens travels at an angle to the surface on which the mouse travels and said light is reflected along a first axis when the surface is non-transparent and along a second different axis when the surface is transparent, said light receiving lens being disposed on said first axis and said light reflecting prism being disposed on said second axis.

4. The optical mouse of claim 3, wherein said first axis is normal to the surface on which the mouse travels, and said second axis is inclined at an angle of reflection of light from said non-transparent surface.

* * * * *

UNITED STATES PATENT AND TRADEMARK OFFICE
CERTIFICATE OF CORRECTION

PATENT NO. : 6,741,234 B2  Page 1 of 1
DATED : May 25, 2004
INVENTOR(S) : Sang Eun Son It is certified that error appears in the above-identified patent and that said Letters Patent is hereby corrected as shown below:

Title page,
Item [*] Notice, "50" should read -- 165 --.

Signed and Sealed this

Twenty-seventh Day of July, 2004

JON W. DUDAS
*Acting Director of the United States Patent and Trademark Office*